3,173,897
PROCESS OF REACTING A POLYISOCYANATE WITH A COMPOUND HAVING ACTIVE HYDROGEN USING A TERTIARY AMINE N-OXIDE AND HYDROGEN PEROXIDE CATALYST MIXTURE

Rowland K. Adams, Brandywine Hundred, and John R. Cooper, Christiana Hundred, Del., assignors to E. I. du Pont de Nemours and Company, Wilmington, Del., a corporation of Delaware
No Drawing. Filed Oct. 21, 1960, Ser. No. 63,967
14 Claims. (Cl. 260—75)

This invention relates to a process of reacting organic polyisocyanate compounds with water or a mixture of water and organic hydroxy compounds and more particularly to such a process wherein a catalyst consisting of a tertiary amine N-oxide in combination with hydrogen peroxide is employed.

It is an object of the present invention to provide a novel chemical process. A further object is to provide an improved process for reacting an organic polyisocyanate compound with water or a mixture of water and an organic hydroxy compound. A still further object is to provide a new process for catalyzing the reaction of an organic polyisocyanate compound with water or a mixture of water and an organic hydroxy compound wherein the catalyst consists of a tertiary amine N-oxide in combination with hydrogen peroxide. Other objects will appear hereinafter.

These and other objects of this invention are accomplished by the process of reacting an organic polyisocyanate with water or a mixture of water and an organic compound having at least one alcoholic hydroxyl group, with the proviso that the reaction be carried out in contact with aqueous hydrogen peroxide and a tertiary amine N-oxide having no isocyanate reactable substituents, said amine N-oxide being selected from the group consisting of tertiary amine N-oxides having only aliphatic carbon atoms adjacently attached to the nitrogen atoms thereof and N-oxides of organic compounds having a pyridine nucleus. The reaction of water or a mixture of water and an organic hydroxy compound with an organic polyisocyanate compound is well-known. Also it is known to employ tertiary amines to catalyze this reaction. Similarly, the use of tertiary amine N-oxides to catalyze this reaction is described and claimed in our copending application Serial No. 63,966, filed of even date herewith. It has now been found that an unexpected synergistic effect occurs when aqueous hydrogen peroxide is used in combination with the tertiary amine N-oxide to catalyze this reaction. It is believed that this discovery is quite unexpected in view of the fact that aqueous hydrogen peroxide itself exhibits no significant catalytic activity for this reaction; however, when it is used in combination with the tertiary amine N-oxide the catalytic activity of the combination is significantly greater than that of the tertiary amine per se. Also, the use of aqueous hydrogen peroxide in combination with the tertiary amine N-oxide results greater catalytic activity than the use of the tertiary amine N-oxide per se.

Any organic polyisocyanate compound including aromatic, aliphatic and cycloaliphatic types may be employed in the present invention. These compounds may contain two or more isocyanate radicals. Mixtures of these polyisocyanate compounds can be employed when desired.

Representative polyisocyanate compounds include
toluene-2,4-diisocyanate,
1,6-hexamethylenediisocyanate,
1,4-tetramethylenediisocyanate,
1,10-decamethylenediisocyanate,
1,5-naphthalenediisocyanate,
cumene-2,4-diisocyanate, 4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate, 2,4-dimethyl-1,3-phenylenediisocyanate,
4,4'-diisocyanatodiphenylether, benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other representative organic polyisocyanates include the polyisocyanates which are described in U.S. 2,683,730; the phenyl indane diisocyanates which are described in U.S. 2,855,385; the organic diisocyanates which are described in U.S. 2,292,443; and the organic triisocyanates which are described in U.S. 2,929,794.

The organic isocyanate compounds which can be used also include the isocyanate-terminated reaction products of a molar excess of any of the above described polyisocyanates with any of the polyhydroxy compounds described below. A representative example is an isocyanate-terminated polyalkyleneether polyurethane which is described in British Patent 733,624.

Any organic compound having at least one alcoholic hydroxyl group as its sole isocyanate reactable functionality can be employed in combination with water for reaction with the organic polyisocyanate compound. Mixtures of two or more of these hydroxy compounds can be employed when desired. Since aqueous hydrogen peroxide is employed as part of the catalyst combination, the water associated with the hydrogen peroxide is always present as a reactant. Representative examples of suitable alcohols can be found on pp. 226–228 of The Systematic Identification of Organic Compounds, R. L. Shriner and R. C. Fuson, 3rd ed., 1948, John Wiley & Sons, Inc., New York; Synthetic Organic Chemistry, R. B. Wagner and H. D. Zook, 1953, John Wiley & Sons, Inc., New York, Table 11 (pp. 182–193) and Tables 13 and 14 (pp. 197–202). Representative examples of low molecular weight dihydroxy compounds can be found on pp. 193–196 of Synthetic Organic Chemistry, supra. Further examples include alkylene oxide modified polyols such as diethylene glycol, (2-hydroxyethoxy)-1-propanol, 4-(2-hydroxyethoxy)-1-butanol, 5-(2-hydroxyethoxy)-1-pentanol, 3-(2-hydroxypropoxy) - 1 - propanol, 4-(2-hydroxypropoxy) - 1 - butanol, 5 - (2 - hydroxypropoxy)-1-pentanol, 1-(2-hydroxyethoxy)-2-butanol, 1-(2-hydroxyethoxy)-2-pentanol, 1 - (2 - hydroxyethoxy) - 2 - hexanol, 1-(2-hydroxyethoxy)-2-octanol, 1-(2-hydroxypropoxy)-2-butanol, 1-(2-hydroxypropoxy) - 2 - propanol, 1-(2-hydroxypropoxy)-2-hexanol, 1-(2-hydroxypropoxy)-2-octanol, 3-(2-hydroxyethoxy)-1,2-propanediol, 3-(2-hydroxypropoxy) - 1,2 - propanediol, 6 - (2-hydroxyethoxy)-1,2-hexanediol, 6-(2-hydroxypropoxy) - 1,2 - hexanediol and 2,4 - dimethyl - 2 - (2 - hydroxyethoxy)methylpentanediol - 1,5. Ethylenically unsaturated low molecular weight diols may be employed. These include 3-allyloxy - 1,5 - pentanediol, 3 - allyloxy - 1,2 - propanediol, 2-allyloxymethyl-2-methyl-1,3-propanediol, 2-methyl-2-[(4-pentenyloxy)methyl]-1,3-propanediol and 3-(o-propenylphenoxy)-1,2-propanediol; others are listed in U.S. 2,927,098, and 2,854,486. Representative examples of low molecular weight polyols having at least 3 hydroxyl groups include: glycerol, 1,2,6-hexanetriol, 1,1,1-trimethylolpropane, 1,1,1-trimethylolethane, pentaerythritol, mannitol, galactitol, talitol, iditol, allitol, altritol, gulitol, arabitol, ribitol, xylitol, lyxitol, erythritol, threitol, 1,2,5,6-tetrahydroxyhexane, meso-inositol, sucrose, glucose, galactose, mannose, fructose, xylose, arabinose, dihydroxyacetone, glucose-$\alpha$-methyl-glucoside, 1,1,1-tris[(2-hydroxyethoxy)methyl]ethane, and 1,1,1-tris[(2-hydroxypropoxy)methyl]propane. Other examples are included in U.S. 2,917,468. The following classes are representative of the hydroxyl-terminated polymers which can be used in the present invention: the hydroxyl-terminated polyhydrocarbons which are described in U.S. 2,877,212; the hydroxyl-terminated polyformals which are described in U.S. 2,870,097; the fatty acid triglycerides which are described in U.S. 2,833,730, and U.S. 2,787,601; the hydroxyl-terminated polyesters which are described in U.S. 2,698,838; U.S. 2,921,915; U.S. 2,591,884; U.S. 2,866,762; U.S. 2,850,476; U.S. 2,602,783; U.S. 2,729,618; U.S. 2,779,689; U.S. 2,811,493 and U.S. 2,621,166; the hydroxymethyl-terminated perfluoromethylenes which are described in U.S. 2,911,390 and U.S. 2,902,473; the polyalkylene-ether glycols which are described in 2,808,391 and British 773,624; the polyalkylenearyleneether glycols which are described in U.S. 2,808,391; the polyalkyleneether triols which are described in U.S. 2,866,774; polyvinyl alcohol and cellulose.

The process of the present invention can be operated at superatmospheric, atmospheric or subatmospheric pressure. Atmospheric pressure is preferred. The reaction is generally operated at temperatures ranging from about 20° C. to about 100° C. Lower temperatures are possible but the reaction rate is often too slow for convenience. Those skilled in the art can select a mixing temperature at which the reaction mixture is fluid enough to permit satisfactory stirring. If the mixing temperature is too high, water may be lost through volatilization; in addition, the reaction may take place so rapidly that adequate mixing and control are not attained. If desired, the reaction may be carried out in an inert solvent. Representative solvents include tetrahydrofuran, o-dichlorobenzene, chlorobenzene, xylene, methylisobutylketone, toluene and ethyl acetate. In general, any solvent used should be free from isocyanate reactable substituents such as groups bearing Zerewitinoff-active hydrogen atoms.

When the organic polyisocyanate is being reacted with water in accordance with the present invention, the reactants and catalyst components can be mixed in any order. Thus, the tertiary amine N-oxide and the aqueous hydrogen peroxide can be mixed separately and the resulting mixture then added to the organic polyisocyanate or a mixture of the organic polyisocyanate and water; the aqueous hydrogen peroxide can be added to a mixture of tertiary amine N-oxide and organic polyisocyanate, the tertiary amine N-oxide can be introduced into a mixture of aqueous hydrogen peroxide and organic polyisocyanate; the aqueous hydrogen peroxide, the amine N-oxide and the polyisocyanate can be simultaneously brought together. Since tertiary amine N-oxides are known to catalyze the dimerization and trimerization of organic isocyanates, it is best not to add them to the organic polyisocyanate much in advance of the aqueous hydrogen peroxide when the organic hydroxy compound is absent.

Additions can be made in any order when the organic polyisocyanate is being reacted with a mixture of the organic hydroxy compound and water. The catalyst components and the reactants can be brought together simultaneously. The catalyst components can be added, together or sequentially, to the organic hydroxy compound and the resulting mixture, in turn, can be introduced into the organic polyisocyanate. The catalyst components can be added, together or sequentially, to a mixture of the organic hydroxy compound and the organic polyisocyanate. The catalyst components can be added, together or sequentially, to the polyisocyanate and the resulting mixture quickly contacted with the hydroxy compound. Since the isocyanate/water reaction is strongly accelerated by the catalyst combination, the addition of the hydroxy compound must not be delayed.

The value of the catalyst concentration can range widely. Those skilled in the art can readily select proportions which will provide the degree of catalytic acceleration desired. In general, the greater the catalyst concentration, the greater the acceleration. About 0.01 to 1.0 mole of tertiary amine N-oxide will be used for every mole of NCO groups. Concentrations below 0.01 mole can be used, but the catalytic effect is not enough to be convenient for some purposes. Concentrations above about 0.3–0.5 mole are usually unnecessary. When concentrations above 1.0 mole are used, the reaction rate may be inconveniently fast. The preferred concentration ranges between about 0.1 to 0.3 mole. When tertiary diamine N-oxides are used, the above proportions can, of course, be halved. The activity of any individual tertiary amine N-oxide will determine the proper amount to use for a particular application. For every mole of tertiary amine N-oxide about 0.1 to 20 moles of hydrogen peroxide is supplied. The catalytic activity of the tertiary amine N-oxide is increased when less than 0.1 mole of hydrogen peroxide is present, but the degree of improvement is not always entirely satisfactory. There is no particular advantage in using more than about 20 moles of hydrogen peroxide per mole of tertiary amine N-oxide. The preferred proportion ranges between about 0.1 to 1 mole. The strength of the aqueous hydrogen peroxide solution is not critical insofar as the operation of the present invention is concerned. Representative solutions which can be used contain 3% and 30% hydrogen peroxide by weight; the latter can be diluted to give solutions of intermediate strength. The water consumed by the organic polyisocyanate can be supplied wholly or in part by the aqueous hydrogen peroxide solution.

Insofar as the operation of the present invention is concerned, the value of the molar ratios of NCO-groups/water and NCO-groups/(water+HO-groups) can vary widely. Those skilled in the art can determine the proportions of reactants best suited for a particular purpose. For example, when making foams by reacting polyisocyanates with water, one often provides a molecule of water for every pair of NCO-groups present.

The tertiary amine N-oxide may be prepared by reaction of the parent tertiary amine with hydrogen peroxide. In a representative procedure, a water-soluble tertiary amine is reacted at about 25–30° C. with a 2-fold molar excess of 10% aqueous hydrogen peroxide for about 48 hours. Completion of reaction is indicated by the disappearance of the characteristic amine odor. The residual hydrogen peroxide is catalytically destroyed by agitation with ruthenium on carbon. After filtering, the water is removed by distillation. The N-oxide thereby obtained is recrystallized from common solvents such as ethyl acetate or benzene. When water-insoluble tertiary amines are employed, acetone can be added to the water to effect solubilization.

Two classes of tertiary amine N-oxides may be employed in combination with the aqueous hydrogen peroxide. The first class includes N-oxides of tertiary amines having only aliphatic carbon atoms adjacently attached to the nitrogen atom or atoms thereof. Although there are no aromatic groups attached to the nitrogen atom, they may be present elsewhere in the molecule. The second class includes N-oxides of organic compounds having a pyridine nucleus. These compounds may, if desired, contain an N-oxide of a tertiary nitrogen atom of the type characteristic of the first class. All of these amine oxides are free from isocyanate-reactable substituents such as isocyanate groups, 1,3-diazacyclobutane-2,4-dione groups, and groups bearing Zerewitinoff-active hydrogen atoms such as primary amino groups, secondary amino groups, amido groups, carboxyl groups, hydroxyl groups, mercapto groups, ureido groups, urethaneo groups, and the like. Mixtures of two or more of these tertiary amine N-oxides may be employed.

Representative examples of types of amine N-oxides included within the first class are the N-oxides of tertiary alkylamines, tertiary cycloalkylamines, and N-alkyl piperidines, N-alkyl morpholines, and the N,N'-dioxides of N,N'-dialkylpiperazines, and N,N,N',N'-tetraalkylalkylenediamines. In general, these tertiary amines have from about 3 to 21 carbon atoms. Representative amine N-oxides are: dimethyldodecylamine N-oxide, dimethyltetradecylamine N-oxide, diethylhexadecylamine N-oxide, methylethyloctadecylamine N-oxide, trimethylamine N-oxide, diethylmethylamine N-oxide, tri-n-propylamine N-oxide, tri-n-butylamine N-oxide, tri-n-amylamine N-oxide,

Example 1

The catalyst and water were added at 30° C. to 25 milliliters of tetrahydrofuran and the solution obtained was introduced into a 125-ml. Erlenmeyer flask agitated by a magnetic stirrer and fitted with a 2-hole rubber stopper holding a glass burette and a gas outlet tube. The reaction was started by introducing, from the burette, a 10 percent by weight solution of toluene-2-4-diisocyanate in tetrahydrofuran at 30° C. The carbon dioxide generated by the isocyanate-water reaction which resulted passed through the outlet tube (of glass) to a T-joint attached to an F and M Model 119C gas chromatograph having a 5-ft. column packed with firebrick coated with Perkin Elmer silicone grease type (0); a helium stream flowed into the other side of the T-joint at the rate of 20 cc./min. The height of the instrument chart tracing for carbon dioxide at any instant was taken as a relative measure of the amount of carbon dioxide generated at that moment. The time required for the carbon dioxide band to reach a maximum and the height of that maximum were recorded for each run and provided a comparative measure of catalyst reactivity. Table I which follows shows the data obtained.

Table I

| Amine N-Oxide | Moles of Amine N-Oxide | Moles of $H_2O_2$ [a] | Moles of TDI [b] | Moles of $H_2O$ | Maximum Chart Reading | Minutes to Chart Maximum |
|---|---|---|---|---|---|---|
| Dimethyloctadecylamine N-oxide | 0.0008 | ---- | 0.0035 | 0.0035 | 11,800 | 2.5 |
|  | 0.0008 | 0.0008 | 0.0035 | 0.0035 | 95,200 | <2 |
| Pyridine N-oxide | ---- | 0.0016 | 0.007 | 0.007 | 1,900 | 20 |
|  | 0.0008 | ---- | 0.0035 | 0.0035 | 8,600 | 16 |
| Diethylcyclohexylamine N-oxide | 0.0008 | 0.0008 | 0.0035 | 0.0035 | 43,000 | 7 |
|  | 0.0008 | ---- | 0.0035 | 0.0035 | 7,200 | ≅2 |
| N-Ethylmorpholine N-oxide | 0.0008 | 0.0008 | 0.0035 | 0.0035 | >102,400 | ≅2 |
|  | 0.0008 | ---- | c 0.0035 | 0.0035 | 4,800 | 24 |
|  | 0.0008 | 0.0008 | c 0.0035 | 0.0035 | 31,700 | ≅5 |

[a] Supplied as a 30% aqueous solution.
[b] TDI=toluene-2,4-diisocyanate.
c 1,6-hexamethylenediisocyanate was used instead of toluene-2,4-diisocyanate.

diethylisopropylamine N-oxide, dimethyl-n-butylamine N-oxide, dimethylcyclohexylamine N-oxide, N-methylpiperidine N-oxide, N-ethylpiperidine N-oxide, N-propylpiperidine N-oxide, N-isopropylpiperidine N-oxide, N-n-butylpiperidine N-oxide, N-isobutylpiperidine N-oxide, N-isoamylpiperidine N-oxide, N-methyl-3-isopropylpiperidine N-oxide, 2-methyl-N,3-diethylpiperidine N-oxide, N-methylmorpholine N-oxide, N-ethylmorpholine N-oxide, N,N'-dimethylpiperazine N,N'-dioxide, N,N'-diethylpiperazine N,N'-dioxide, N,N'-dipropylpiperazine N,N'-dioxide, N,N'-diisoamylpiperazine N,N'-dioxide, triethylenediamine N,N'-dioxide, N,N,N',N'-tetramethyltrimethylenediamine N,N'-dioxide, N,N,N',N'-tetraethyltrimethylenediamine N,N'-dioxide, N,N,N',N'-tetramethyltetramethylenediamine N,N'-dioxide, and N,N,N',N'-tetramethylhexamethylenediamine N,N'-dioxide.

Representative examples of types of amine N-oxides included within the second class are pyridine N-oxides, quinoline N-oxides, and isoquinoline N-oxides. In general, these amines have from about 5 to 18 carbon atoms. Representative amine N-oxides are: pyridine N-oxide, 3-chloropyridine N-oxide, 3,5-dibromopyridine N-oxide, 4-methylpyridine N-oxide, 3-ethyl-pyridine N-oxide, 2-methylpyridine N-oxide, 4-tert-butylpyridine N-oxide, 3-phenylpyridine N-oxide, 3-(p-isopropyl)benzylpyridine N-oxide, 4-p-isopropylphenethylpyridine N-oxide, 4-p-methoxyphenethylpyridine N-oxide, 3-benzhydrylpyridine N-oxide, quinoline N-oxide, 8-chloroquinoline N-oxide, 4-bromoquinoline N-oxide, 3-methylquinoline N-oxide, 4-ethylquinoline N-oxide, 7-isopropylquinoline N-oxide, 5,6-benzoquinoline N-oxide, 6-chloro-4-methylquinoline N-oxide, isoquinoline N-oxide, 8 chloroisoquinoline N-oxide, 4-bromoisoquinoline N-oxide, and 6-methylisoquinoline N-oxide.

The following examples will better illustrate the nature of the present invention; however, the invention is not intended to be limited to these examples. Parts are by weight unless otherwise indicated.

As many widely different embodiments of this invention may be made without departing from the spirit and scope thereof, it is to be understood that this invention is not limited to the specific embodiments thereof except as defined in the appended claims.

What is claimed is:

1. In the process of reacting an organic polyisocyanate compound with a material selected from the group consisting of water and a mixture of water with an organic compound having at least one alcoholic hydroxyl group as its sole isocyanate reactable functionality, the improvement comprising carrying out the reaction in contact with a catalytic amount of a catalyst consisting of aqueous hydrogen peroxide and a tertiary amine N-oxide having no isocyanate-reactable substituents said amine N-oxide being selected from the group consisting of tertiary amine N-oxides having only aliphatic carbon atoms adjacently attached to the nitrogen atoms thereof and N-oxides of organic compounds having a pyridine nucleus.

2. A process according to claim 1 wherein the organic polyisocyanate is toluene-2,4-diisocyanate.

3. A process according to claim 2 wherein the organic compound having at least one alcoholic hydroxyl group is a polyalkyleneether polyol.

4. A process according to claim 2 wherein the organic compound having at least one alcoholic hydroxyl group is a polyester polyol.

5. A process according to claim 3 wherein the polyalkyleneether polyol is a polypropyleneether glycol.

6. A process according to claim 3 wherein the polyalkyleneether polyol is a polypropyleneether triol.

7. A process according to claim 1 wherein the tertiary amine N-oxide is N-ethylmorpholine N-oxide.

8. A process according to claim 1 wherein the ratio of hydrogen peroxide to tertiary amine N-oxide ranges from 0.1 to 1.0 mole of hydrogen peroxide per mole of tertiary amine N-oxide.

9. A process according to claim 8 wherein the concentration of tertiary amine N-oxide ranges from 0.1 to 0.3 mole per mole of isocyanate groups.

10. A process according to claim 1 wherein the tertiary amine N-oxide is diethylcyclohexyamine N-oxide.

11. A process according to claim 1 wherein the tertiary amine N-oxide is N-ethylmorpholine N-oxide.

12. In the process of reacting an organic polyisocyanate compound with water, the improvement comprising carrying out the reaction in contact with a catalytic amount of a catalyst consisting of aqueous hydrogen peroxide and a tertiary amine N-oxide having no isocyanate-reactable substitutents, said amine N-oxide being selected from the group consisting of tertiary amine N-oxides having only aliphatic carbon atoms adjacently attached to the nitrogen atoms thereof and N-oxides of organic compounds having a pyridine nucleus.

13. In the process of reacting toluene-2-4-diisocyanate with water, the improvement comprising carrying out the reaction in contact with a catalytic amount of a catalyst consisting of aqueous hydrogen peroxide and a tertiary amine N-oxide having no isocyanate-reactable substituents, said amine N-oxide being selected from the group consisting of tertiary amine N-oxides having only aliphatic carbon atoms adjacently attached to the nitrogen atoms thereof and N-oxides of organic compounds having a pyridine nucleus, said hydrogen peroxide being supplied in the proportion of at least 0.1 mole per mole of said amine N-oxide.

14. In the process of reacting 1,6-hexamethylene-diisocyanate with water, the improvement comprising carrying out the reaction in contact with a catalytic amount of a catalyst consisting of aqueous hydrogen peroxide and a tertiary amine N-oxide having no isocyanate-reactable substituents, said amine N-oxide being selected from the group consisting of tertiary amine N-oxides having only aliphatic carbon atoms adjacently attached to the nitrogen atoms thereof and N-oxides of organic compounds having a pyridine nucleus, said hydrogen peroxide being supplied in the proportion of at least 0.1 mole per mole of said amine N-oxide.

References Cited in the file of this patent

UNITED STATES PATENTS

| | | |
|---|---|---|
| 2,740,743 | Pace | Apr. 3, 1956 |
| 2,879,250 | Eisenmann et al. | Mar. 24, 1959 |
| 2,894,919 | Simon et al. | July 14, 1959 |
| 2,977,330 | Brower | Mar. 28, 1961 |

FOREIGN PATENTS

| | | |
|---|---|---|
| 748,697 | Great Britain | May 9, 1956 |